US009477229B1

(12) United States Patent
Lee et al.

(10) Patent No.: US 9,477,229 B1
(45) Date of Patent: Oct. 25, 2016

(54) UNMANNED AERIAL VEHICLE CONTROL METHOD AND UNMANNED AERIAL VEHICLE USING SAME

(71) Applicant: HON HAI PRECISION INDUSTRY CO., LTD., New Taipei (TW)

(72) Inventors: Hou-Hsien Lee, New Taipei (TW); Chang-Jung Lee, New Taipei (TW); Chih-Ping Lo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/793,307

(22) Filed: Jul. 7, 2015

(30) Foreign Application Priority Data

Jun. 15, 2015 (TW) .............................. 104119320 A

(51) Int. Cl.
*G05D 1/04* (2006.01)
*B64C 39/02* (2006.01)
*G05D 1/08* (2006.01)

(52) U.S. Cl.
CPC ............. *G05D 1/042* (2013.01); *B64C 39/024* (2013.01); *G05D 1/0816* (2013.01); *B64C 2201/08* (2013.01); *B64C 2201/108* (2013.01)

(58) Field of Classification Search
CPC ................. B64C 2201/088; B64C 2201/108; B64C 2201/024; B64C 2201/18; B64C 29/02; B64C 29/00
See application file for complete search history.

(56) References Cited

U.S. PATENT DOCUMENTS

| 8,141,823 | B2* | 3/2012 | Hursig | B64C 27/20 244/183 |
| 9,139,279 | B2* | 9/2015 | Heppe | B64B 1/54 |
| 9,211,951 | B2* | 12/2015 | Hachtmann | B64C 39/022 |
| 9,352,834 | B2* | 5/2016 | Davies | G05D 1/102 |
| 2003/0033798 | A1* | 2/2003 | Dickau | B64C 15/02 60/226.1 |
| 2004/0143602 | A1* | 7/2004 | Ruiz | H04N 7/181 |
| 2010/0152933 | A1* | 6/2010 | Smoot | G01C 21/165 701/16 |
| 2011/0001001 | A1* | 1/2011 | Bryant | B64C 29/0033 244/12.5 |
| 2012/0205488 | A1* | 8/2012 | Powell | B64C 39/024 244/63 |
| 2012/0248259 | A1* | 10/2012 | Page | B64C 29/02 244/7 A |
| 2014/0249694 | A1* | 9/2014 | Cathcart | B64D 31/06 701/2 |
| 2016/0090179 | A1* | 3/2016 | Childress | B64C 29/0091 244/63 |

FOREIGN PATENT DOCUMENTS

CN 102538828 A 7/2012

* cited by examiner

*Primary Examiner* — Thomas Tarcza
*Assistant Examiner* — Alex C Dunn
(74) *Attorney, Agent, or Firm* — Zhigang Ma

(57) ABSTRACT

A control method for an unmanned aerial vehicle (UAV) is provided. The UAV includes an accelerometer, a gyroscope, at least one drive unit and at least one rotor. The method includes: detecting current motion data from the accelerometer, wherein the motion data includes displacement of the UAV; determining whether the UAV is thrown up based on the motion data; detecting current ascending velocity of the UAV; determining whether the current ascending velocity of the UAV is substantially equal to zero; detecting current pitch angle and current angular velocity from the gyroscope if the current ascending velocity of the UAV is substantially equal to zero; calculating drive data based on the current pitch angle and current angular velocity; and enabling the at least one drive unit to drive at least one rotor to rotate so as to cause the UAV to hover evenly.

15 Claims, 7 Drawing Sheets

UNMANNED AERIAL VEHICLE CONTROL METHOD AND UNMANNED AERIAL VEHICLE USING SAME

FIELD

The subject matter herein generally relates to an unmanned aerial vehicle control method and an unmanned aerial vehicle.

BACKGROUND

Unmanned aerial vehicles (UAVs) become more widely used, for example, for performing surveillance, reconnaissance, and exploration tasks for military and civilian applications. Generally, before an unmanned aerial vehicle is controlled to take off, the unmanned aerial vehicle is placed at a stable surface and then can be controlled by a remoter to take off the surface. Sometimes, the process of take off may be not smooth due to unskilled operations. Therefore, there is a need for an UAV control method capable of providing a relatively smooth taking off under a condition that whoever operates the UAV.

BRIEF DESCRIPTION OF THE DRAWINGS

Implementations of the present technology will now be described, by way of example only, with reference to the attached figures.

DETAILED DESCRIPTION

Figure 1:
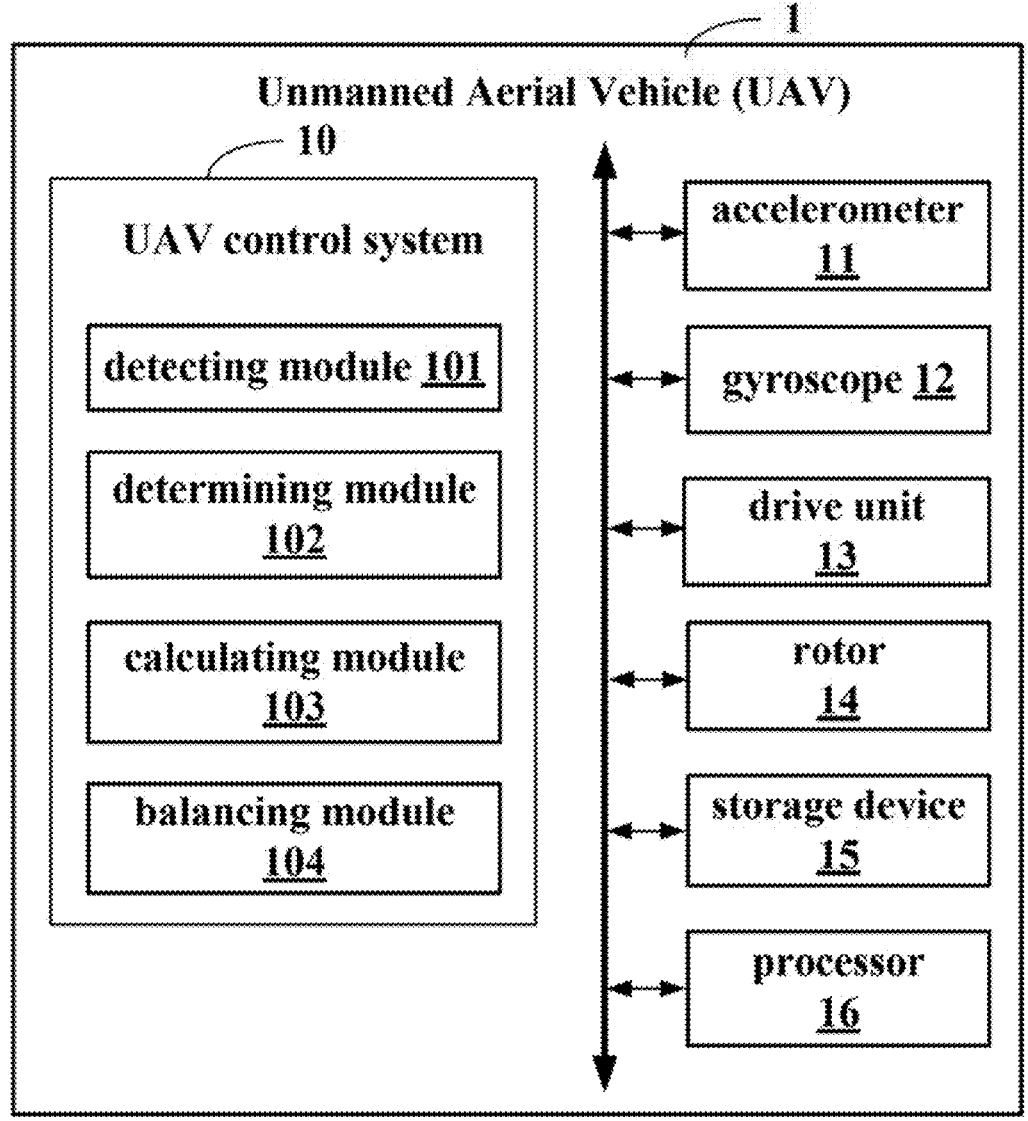
FIG. 1 is a block diagram of an exemplary embodiment of an UAV.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

FIG. 1 illustrates a diagram of an exemplary embodiment of an unmanned aerial vehicle (UAV) 1. In the exemplary embodiment, the UAV 1 can include, but not limited to, an accelerometer 11, a gyroscope 12, at least one drive unit 13, at least one rotor 14, a storage device 15, and a processor 16. The storage device 15 can be configured to store data related to operation of the UAV 1. The processor 16 can be configured to control operations of the UAV 1.

The accelerometer 11 can be a two-axis accelerometer or a three-axis accelerometer. The accelerometer 11 can be configured to detect velocity and acceleration in two-axis or three-axis.

The gyroscope 12 can be configured to detect attitude data of the UAV, including pitch angles, angular velocity and orientation. In at least one embodiment, the gyroscope 12 can be substituted by a currently available inertial measurement unit (IMU).

Figure 7:
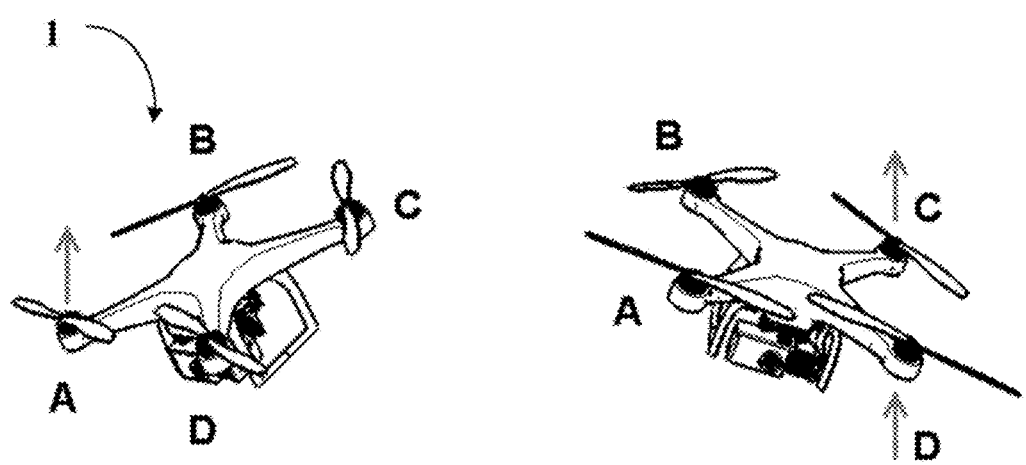
FIG. 7 is a diagrammatic view of an exemplary embodiment of a process of driving rotors of an UAV.

The least one drive unit 13 can be configured to drive the at least one rotor 14 to rotate as illustrated in FIG. 7. In the exemplary embodiment, the drive unit 13 can be a motor.

The storage device 15 can be an internal storage unit of the UAV 1, for example, a hard disk or memory, or a pluggable memory, for example, Smart Media Card, Secure Digital Card, Flash Card. In at least one embodiment, the storage device 15 can include two or more storage devices such that one storage device is an internal storage unit and the other storage device is a pluggable memory. The processor 16 can be a central processing unit (CPU), a microprocessor, or other data processor chip that performs functions of the UAV 1.

An UAV control system 10 can include computerized instructions in the form of one or more programs that can be stored in the storage device 15 and executed by the processor 16. In the embodiment, the UAV control system 10 can be integrated in the processor 16. In at least one embodiment, the UAV control system 10 can be independent from the processor 16. Referring to FIG. 1, the system 10 can include one or more modules, for example, a detecting module 101, a determining module 102, a calculating module 103, and a balancing module 104. A "module," as used herein, refers to logic embodied in hardware or firmware, or to a collection of software instructions, written in a programming language, such as, JAVA, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The detecting module 101 can be configured to detect current motion data and attitude data. In the exemplary embodiment, the motion data can include displacement, current velocity and current acceleration. The attitude data can include angular velocity, orientation, and pitch angles.

The determining module 102 can be configured to determine whether the UAV is thrown up and determine whether current ascending velocity of the UAV is substantially equal to zero.

The calculating module 103 can be configured to calculate drive data based on the attitude data when the current velocity of the UAV is substantially equal to zero.

The balancing module 104 can be configured to drive the UAV based on the drive data. The drive data can cause the UAV to evenly hover at a top point where the current velocity of the UAV is substantially equal to zero.

Figure 2:
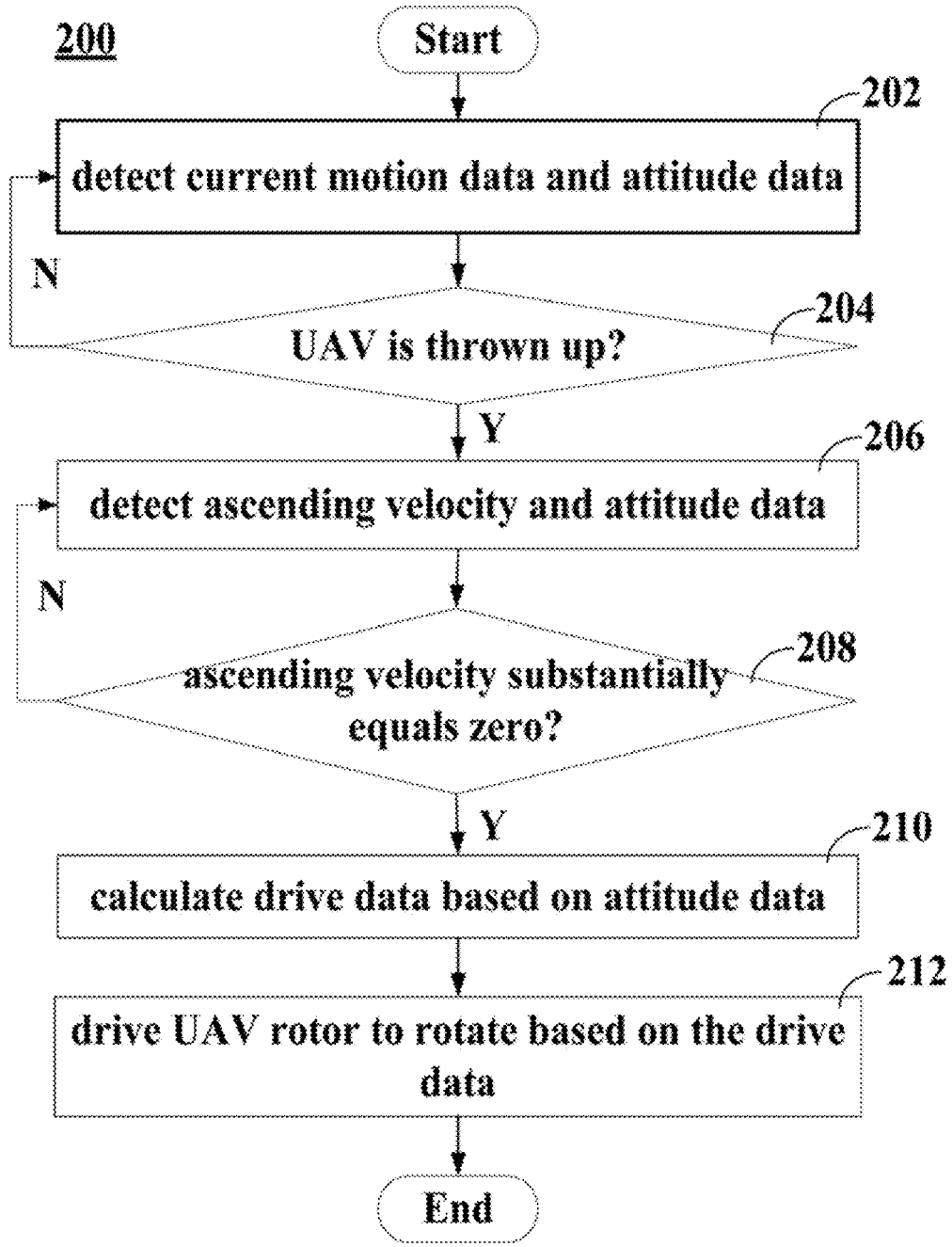
FIG. 2 is a flowchart of an exemplary embodiment of an UAV control method.

Referring to FIG. 2, a flowchart is presented in accordance with an example embodiment of an UAV control system which is being thus illustrated. The example method 200 is provided by way of example, as there are a variety of ways to carry out the method. The method 200 described below can be carried out using the configurations illustrated in FIG. 1, for example, and various elements of the figure is referenced in explaining example method 200. Each block shown in FIG. 2 represents one or more processes, methods or subroutines, carried out in the exemplary method 200. Furthermore, the illustrated order of blocks is by example only and the order of the blocks can change according to the present disclosure. Additional blocks may be added or fewer blocks may be utilized, without departing from this disclosure. The exemplary method 200 can be executed by an UAV, and can begin at block 202. The UAV can include an accelerometer configured to detect current velocity and acceleration of the UAV, a gyroscope configured to detect current attitude data of the UAV, and a storage device configured to store related information.

Figure 3:
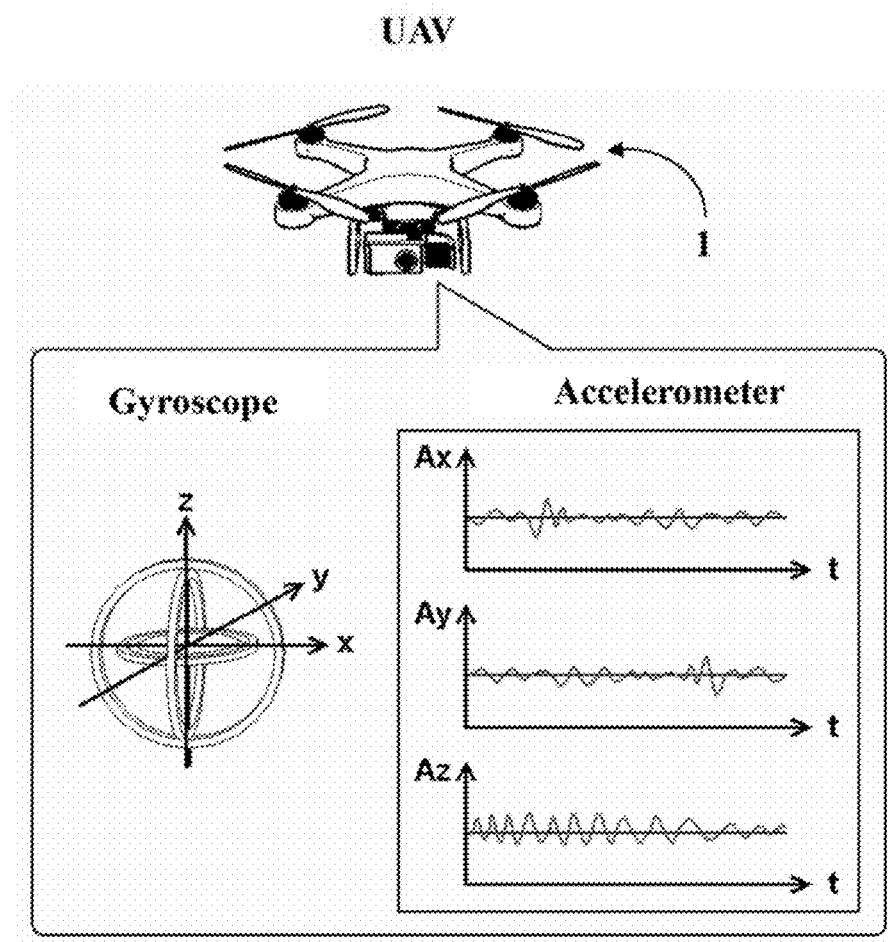
FIG. 3 is a diagrammatic view of an exemplary embodiment of an UAV with a gyroscope and an accelerometer.

At block 202, the UAV causes the accelerometer to detect current motion data and the gyroscope to detect current attitude data when the UAV is powered on. In the exemplary embodiment, the motion data can include displacement, current velocity and current acceleration. The attitude data can include angular velocity, orientation, and pitch angle. Referring to FIG. 3, an exemplary diagrammatic view of an exemplary embodiment of the gyroscope and the accelerometer is illustrated. The Gyroscope can detect angular velocity in three axis including X, Y, Z., therefore angular displacement in three axis can be derived. The accelerometer can detect displacement variation along a time line in three axis including X, Y, Z, therefore, velocity and acceleration can be derived.

At block 204, the UAV determines whether the UAV is thrown up based on the detected data. In an exemplary embodiment, the UAV determines based on the detected motion data. In another exemplary embodiment, the UAV determines based on the detected attitude data. In at least one exemplary embodiment, the UAV determines based on both the detected motion data and the detected attitude data. If the UAV is determined to be thrown up, the process goes to block 206, otherwise, the process goes back to block 204.

At block 206, the UAV causes the accelerometer to detect current ascending velocity and causes the gyroscope to detect current attitude data.

Figure 4:
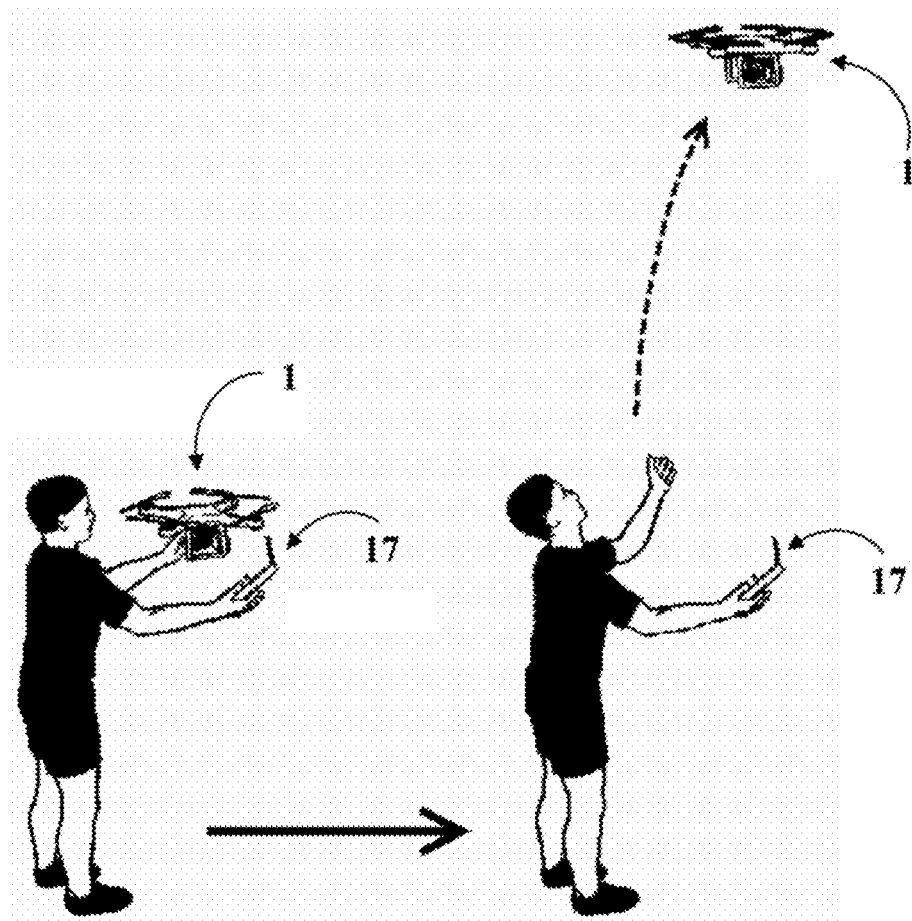
FIG. 4 is a diagrammatic view of an exemplary embodiment of an UAV when the UAV is throwing up.
Figure 5:
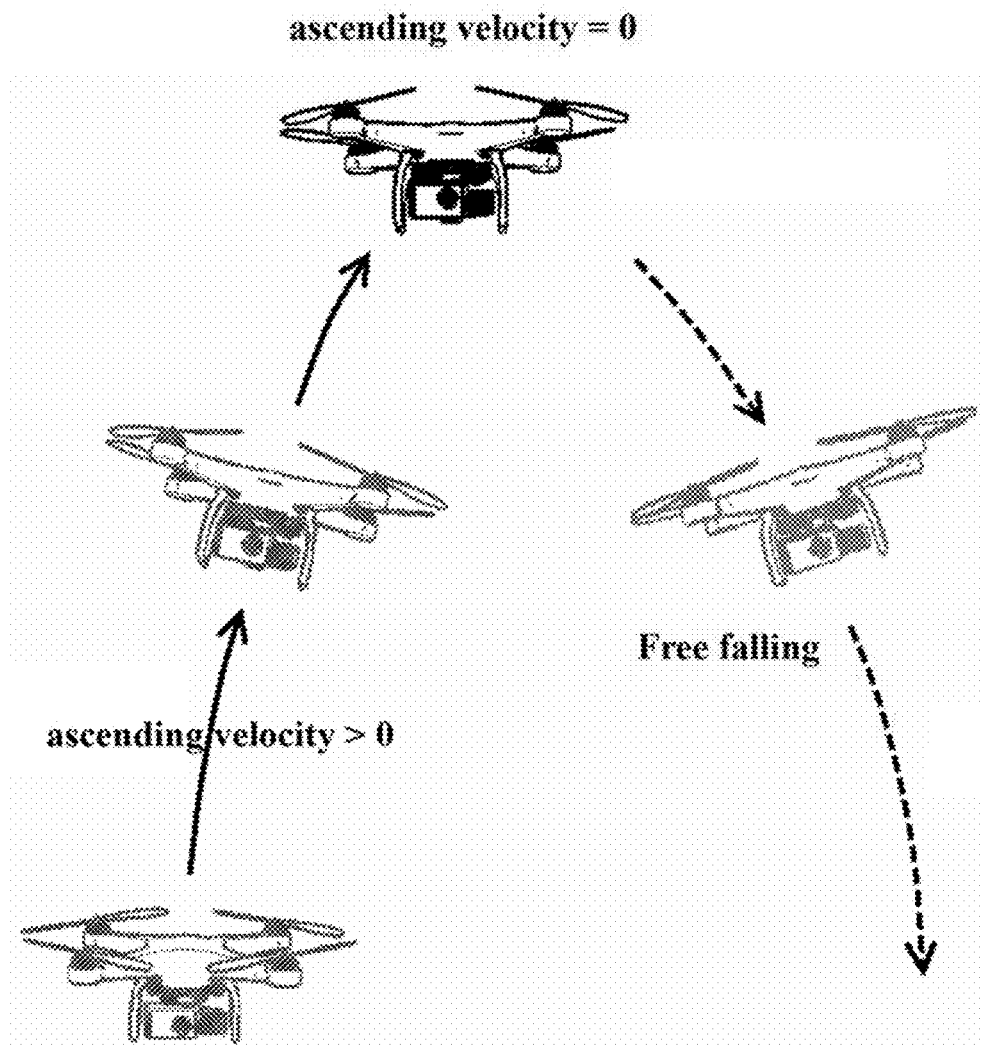
FIG. 5 is a diagrammatic view of an exemplary embodiment of an up path of an UAV.

At block 208, the UAV determines whether the ascending velocity substantially equals to zero. If the ascending velocity of the UAV is determined to be substantially equal to zero, the process goes to block 210, otherwise, the process goes to block 206. Referring to FIGS. 4 and 5, the UAV 1 ascends in a decreasing velocity after being thrown up. When the UAV 1 climbs up to a top point where the ascending velocity of the UAV 1 substantially equals to zero, the UAV 1 will free fall if no extra up force applied on the UAV 1.

At block 210, the UAV calculates drive data based on the attitude data. The drive data can include rotating orientation, rotating speed of each motor.

Figure 6:
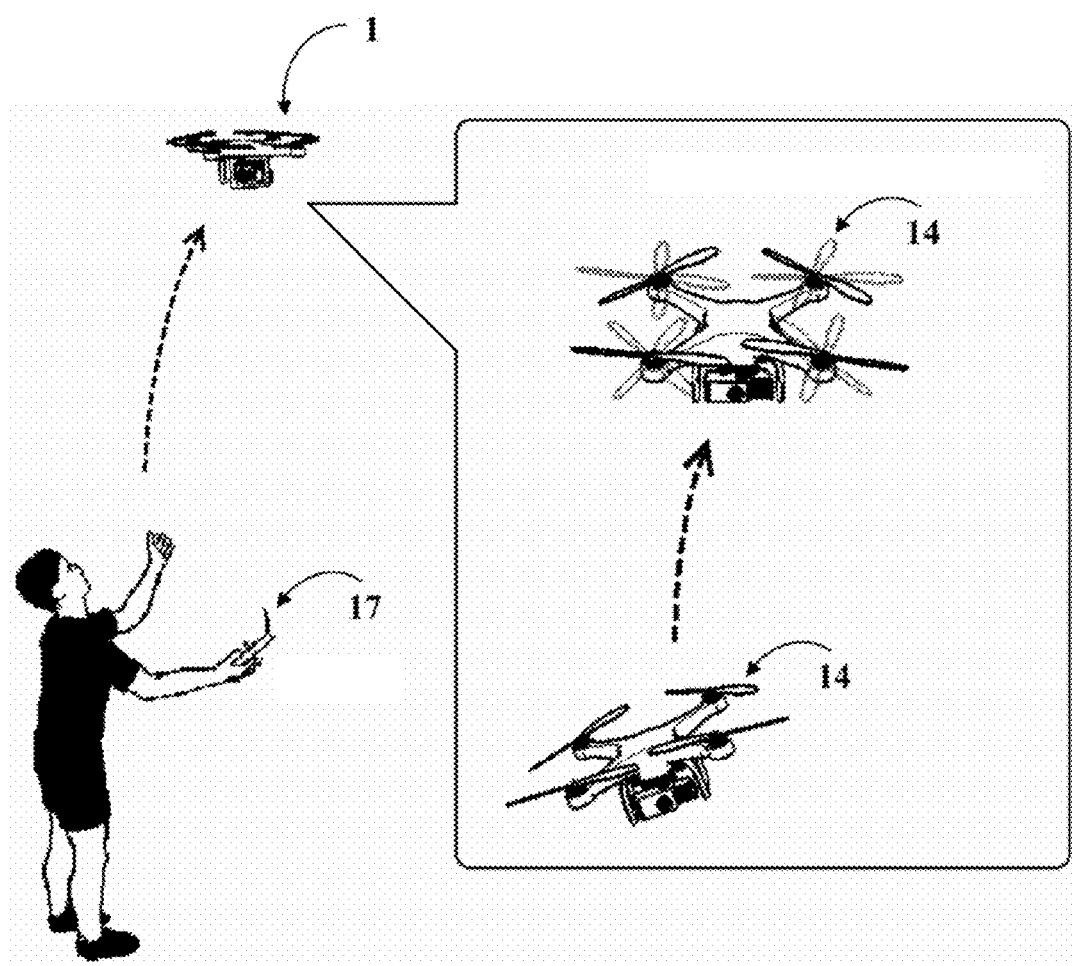
FIG. 6 is a diagrammatic view of an exemplary embodiment of an UAV with rotors being driven.

At block 212, the UAV cause the drive unit to rotate the rotor based on the drive data. Referring to FIG. 5, when the ascending velocity of the UAV 1 substantially equals to zero, the drive unit is enabled to rotate the rotor based on the drive data. Referring to FIG. 6, the UAV 1 includes four rotors 14, and each of the rotors 14 rotates according to rotation of the corresponding motor.

The drive data can be configured to have the UAV 1 hovered under a balanced condition. Referring to FIG. 7, if the UAV 1 is pitching to the left when the ascending velocity of the UAV 1 is substantially equal to zero, the drive data can increase rotation speed of the rotor A so as to balance the UAV 1. In at least one exemplary embodiment, the drive data can decrease rotation speed of the rotor C. On the contrary, if the UAV 1 is pitching to the right when the ascending velocity of the UAV 1 is substantially equal to zero, the drive data can increase rotation speed of the rotors C and D. Similarly, in at least one exemplary embodiment, the drive data can decrease rotation speed of the rotors A and B.

In at least one embodiment, the UAV 1 can hover under a balanced condition for a predefined time interval. During the predefined time interval, the UAV can be operated through a remoter 17 (referring to FIGS. 4 and 6). If the UAV cannot receive any remote commands from the remoter 17 during the predefined time interval, the UAV can lands vertically at a surface, for example, the ground.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An unmanned aerial vehicle, comprising:
   an accelerometer;
   a gyroscope;
   at least one rotor;
   at least one drive unit;
   a non-transitory storage device configured to store constructions; and
   a processor configured to execute instructions to cause the processor to:
      obtain current motion data from the accelerometer, wherein the motion data includes displacement of the unmanned aerial vehicle;
      determine whether the unmanned aerial vehicle is thrown up based on the motion data;
      obtain current ascending velocity of the unmanned aerial vehicle from the gyroscope;
      determine whether the current ascending velocity of the unmanned aerial vehicle is substantially equal to zero;
      detect current pitch angle and current angular velocity from the gyroscope if the current ascending velocity of the unmanned aerial vehicle is substantially equal to zero;
      calculate drive data based on the current pitch angle and current angular velocity; and
      enable the drive unit to drive the at least one rotor to rotate so as to cause the unmanned aerial vehicle to hover evenly.

2. The unmanned aerial vehicle according to claim 1, wherein the instructions further cause the processor to:
   obtain current angular velocity from the gyroscope; and
   determine whether the unmanned aerial vehicle is thrown up based on the current angular velocity.

3. The unmanned aerial vehicle according to claim 1, wherein the unmanned aerial vehicle hovers evenly at a point where the ascending velocity of the unmanned aerial vehicle is substantially zero.

4. The unmanned aerial vehicle according to claim 1, wherein the drive data cause a left rotor arranged at a left side of the unmanned aerial vehicle to rotate faster if the unmanned aerial vehicle is pitching the left when the current ascending velocity of the unmanned aerial vehicle is substantially zero.

5. The unmanned aerial vehicle according to claim 1, wherein the drive data cause a right rotor arranged at a right side of the unmanned aerial vehicle to rotate in a lower speed if the unmanned aerial vehicle is pitching the left when the current ascending velocity of the unmanned aerial vehicle is substantially zero.

6. The unmanned aerial vehicle according to claim 1, wherein the drive data cause a left rotor arranged at a left side of the unmanned aerial vehicle to rotate in a lower speed if the unmanned aerial vehicle is pitching the right when the current ascending velocity of the unmanned aerial vehicle is substantially zero.

7. The unmanned aerial vehicle according to claim 1, wherein the drive data cause a right rotor arranged at a right side of the unmanned aerial vehicle to rotate in a faster speed if the unmanned aerial vehicle is pitching the right when the current ascending velocity of the unmanned aerial vehicle is substantially zero.

8. A processor based method for controlling an unmanned aerial vehicle comprising:
   detecting, at an accelerometer, current motion data including displacement of the unmanned aerial vehicle;
   determining, at the unmanned aerial vehicle, whether the unmanned aerial vehicle is thrown up based on the motion data;
   detecting, at the accelerometer, current ascending velocity of the unmanned aerial vehicle;
   determining, at the unmanned aerial vehicle, whether the current ascending velocity of the unmanned aerial vehicle is substantially equal to zero;
   detecting, at a gyroscope, current pitch angle and current angular velocity if the current ascending velocity of the unmanned aerial vehicle is substantially equal to zero;
   calculating, at the unmanned aerial vehicle, drive data based on the current pitch angle and current angular velocity; and
   enabling, at the unmanned aerial vehicle, a drive unit to drive a rotor to rotate so as to cause the unmanned aerial vehicle to hover evenly.

9. The method according to claim 8, further comprising:
   detecting, at the gyroscope, current angular velocity; and
   determining, at the unmanned aerial vehicle, whether the unmanned aerial vehicle is thrown up based on the current angular velocity.

10. The method according to claim 8, wherein the unmanned aerial vehicle hovers evenly at a point where the ascending velocity of the unmanned aerial vehicle is substantially zero.

11. The method according to claim 8, wherein the drive data cause a left rotor arranged at a left side of the unmanned aerial vehicle to rotate faster if the unmanned aerial vehicle is pitching the left when the current ascending velocity of the unmanned aerial vehicle is substantially zero.

12. The method according to claim 8, wherein the drive data cause a right rotor arranged at a right side of the unmanned aerial vehicle to rotate in a lower speed if the unmanned aerial vehicle is pitching the left when the current ascending velocity of the unmanned aerial vehicle is substantially zero.

13. The method according to claim 8, wherein the drive data cause a left rotor arranged at a left side of the unmanned aerial vehicle to rotate in a lower speed if the unmanned aerial vehicle is pitching the right when the current ascending velocity of the unmanned aerial vehicle is substantially zero.

14. The method according to claim 8, wherein the drive data cause a right rotor arranged at a right side of the unmanned aerial vehicle to rotate in a faster speed if the unmanned aerial vehicle is pitching the right when the current ascending velocity of the unmanned aerial vehicle is substantially zero.

15. A non-transitory computer readable medium storing computer readable instructions, the instructions causing a process to:
   obtain current motion data from an accelerometer, wherein the motion data includes displacement of an unmanned aerial vehicle;
   determine whether the unmanned aerial vehicle is thrown up based on the motion data;
   obtain current ascending velocity of the unmanned aerial vehicle from a gyroscope;
   determine whether the current ascending velocity of the unmanned aerial vehicle is substantially equal to zero;
   obtain current pitch angle and current angular velocity from the gyroscope if the current ascending velocity of the unmanned aerial vehicle is substantially equal to zero;
   calculate drive data based on the current pitch angle and current angular velocity; and
   enable a drive unit to drive at least one rotor to rotate so as to cause the unmanned aerial vehicle to hover evenly.

* * * * *